United States Patent [19]

Parks et al.

[11] Patent Number: 5,160,758
[45] Date of Patent: Nov. 3, 1992

[54] PROCESS FOR THE PRODUCTION OF A PROTEIN GRANULE SUITABLE FOR USE AS A MEAT EXTENDER

[75] Inventors: Laura L. Parks, Ballwin, Mo.; Allen D. Greatting, Columbia, Ill.

[73] Assignee: Protein Technologies International, Inc., St. Louis, Mo.

[21] Appl. No.: 708,159

[22] Filed: May 31, 1991

[51] Int. Cl.$^5$ ................................................ A23J 3/16
[52] U.S. Cl. ................................... 426/506; 426/518; 426/519; 426/573; 426/656; 426/802
[58] Field of Search ............... 426/506, 656, 802, 89, 426/573, 518, 519

[56] References Cited

U.S. PATENT DOCUMENTS

| | | | |
|---|---|---|---|
| 3,102,031 | 8/1963 | MacAllister et al. | 426/89 |
| 3,814,823 | 6/1974 | Yang et al. | 426/506 |
| 3,940,495 | 2/1976 | Flier | 426/656 |
| 4,001,441 | 1/1977 | Liepa | 426/506 |
| 4,045,590 | 8/1977 | Weigle | 426/656 |
| 4,276,319 | 6/1981 | Nguyen et al. | 426/802 |

FOREIGN PATENT DOCUMENTS 0352062 1/1990 European Pat. Off.

Primary Examiner—R. B. Penland
Attorney, Agent, or Firm—Virgil B. Hill

[57] ABSTRACT

A process for the production of a protein granules is described in which a vegetable protein isolate is hydrated to a ratio of about 2 to 3.5 parts of water to 1 part of isolate, wherein the water is at a temperature of at least about 50° C. The hydrated isolate is then blended under conditions of shear for a period of time sufficient to form a hydrated protein granule. The formed granules is highly suitable as an extender for ground meats or as an ingredient in meat analogs.

6 Claims, No Drawings

PROCESS FOR THE PRODUCTION OF A PROTEIN GRANULE SUITABLE FOR USE AS A MEAT EXTENDER

BACKGROUND OF THE INVENTION

This invention relates to a process for the production of a hydrated protein granule from a vegetable protein isolate which is suitable for use as an extender for meat products or as an ingredient in meat analogs.

Vegetable protein products including soy flour, soy concentrates and soy isolates have become widely used and accepted food ingredients. Among the vegetable protein products which have been the most widely accepted are the textured vegetable protein materials which have gained wide acceptance as a meat extender. The extended meat products are comparable in nutrition and quality to the natural meat products.

A variety of textured vegetable protein materials and processes for the production have been proposed. Generally recognized as one of the first processes for texturization of protein was that described in U.S. Pat. No. 2,682,466. Edible protein filaments were produced by a spinning process similar to that for the spinning of textiles. The starting material for this texturization process was a protein isolate, which has the bulk of oil and carbohydrates removed to achieve a protein content of 90-95% by weight on a dry basis.

Although numerous texturization techniques have been proposed for materials of lower protein content such as soybean meal, soy flour or concentrates, the most widely used and commercially successful technique for the texturization of vegetable protein material is the extrusion process described in U.S. Pat. No. 3,940,495. This process produces an expanded, meat simulating product which is capable of rehydration with water and upon rehydration is highly suitable as a meat extender. This type of extender was approved for use for the School Lunch Program by the U.S. Department of Agriculture, Food and Nutrition Service (FNS Notice 219) and since then has found wide usage in this program as well as by meat processors for the production of extended meat.

Other texturization processes too numerous to categorize have also been proposed following development of the extrusion process. These processes including the extrusion process, employ lower protein content vegetable protein materials as well as vegetable protein isolates. Some of these processes describe variations in the extrusion process described above in U.S. Pat. No. 3,940,495 for achieving differences in density or functionality of the textured product as well as an improvement or modification of the flavor or texture of the resultant product. Other processes have been directed to the production of non-expanded textured products, for example, an agglomerated protein material as described in U.S. Pat. No. 4,045,590 or an unpuffed proteinaceous extrudate as described in U.S. Pat. No. 3,498,794 and 3,968,268.

More recently U.S. Pat. No. 4,276,319 describes an extruded, dried and granulated protein gel suitable as a meat extruder which is prepared from a vegetable protein isolate.

A simple and effective procedure for the production of a composite protein material, consisting of meat and a vegetable protein isolate is described in European Pat. Publication No. 0352062 published Jan. 24, 1990 in which frozen meat is mixed with a vegetable protein isolate, and water and mixed under conditions of shear to form a composite product that blends readily with meat. This procedure has the advantage of simplicity, does not require expensive equipment and can therefore be readily performed by a food manufacturer at minimal expense.

In spite of the commercially developed nature of the vegetable protein industry, a continuing need exists for specific types of meat extenders exhibiting specific functional properties for various food uses.

It is also an object to provide for the production of a hydrated protein material from a vegetable protein isolate which exhibits desirable functional characteristics and blends well with ground meat to provide a mixture comparable to the natural meat.

It is also an object to provide for the production of a granule which is suitable as an ingredient in meat analogs.

It is a further object to provide a process for the production of the above material which is convenient and reliable to practice on a commercial basis.

SUMMARY OF THE INVENTION

The present invention relates to a process for the production of a protein granule that is suitable as an extender for various types of meat. The process represents a simple but effective means for a meat processor to extend meat products with a vegetable protein material but without the need for expensive equipment such as extruders and drying equipment. The process of the present invention comprises initially hydrating a vegetable protein isolate in order to provide a ratio of about 2 to about 3.5 parts by weight of water to about 1 part by weight of the isolate. It is important to the texture and functionality of the granule that the water used to hydrate the granule be heated, preferably to a temperature of at least about 50° C., and most preferably to a temperature of about 60°-80° C. The use of heated water in order to hydrate the isolate is an important step in providing the requisite degree of texture or firmness in the granule. Following hydration of the isolate the isolate is blended under conditions of shear for a period of time sufficient to form a granule which is suitable for use as a meat extender or meat analog ingredient. A preferred procedure is to blend the isolate under conditions of reduced atmospheric pressure such as a vacuum in order to increase the firmness of the granule.

DESCRIPTION OF THE PREFERRED EMBODIMENTS

The present process initially involves the selection of a vegetable protein isolate as the starting material. Vegetable protein isolates are a well-known product that are produced from vegetable protein materials such as soybeans. Typically, they are produced by solubilization of the protein from the soybeans, followed by removal of the residual carbohydrates. Subsequent acid precipitation of the solubilized protein results in a high purity proteinaceous material. Drying of the precipitated protein provides an isolate with greater than 90% protein on a dry weight basis. The choice of the exact isolate used in the present invention is not critical to its practice although preferred isolates are those obtained from soybeans and a variety of soy protein isolates are commercially available from various manufacturers. Typical isolates that may be used include "Supro 500E", "Supro 515", "Fujipro 545" and "Fujipro 540"

all of which can be purchased from Protein Technologies International, Checkerboard Square, St. Louis, Mo. 63164.

Following selection of a suitable vegetable protein isolate, it is hydrated and blended under conditions of high shear in order to form a protein granule which is suitable as a meat extender or meat analog ingredient. Although the present invention should not be considered as being dependent on specific equipment, nevertheless hydration and blending can be carried out virtually simultaneously with a standard commercial bowl cutter such as Kramer Grebe VSM65, manufactured by Kramer-Grebe, Biedenkopf-Wallau, Germany. This type of equipment provides the rapid blending or mixing of the protein and water in order to rapidly hydrate the protein as well as provide the conditions of shear for formation of the granule from the hydrated protein isolate. This equipment also includes means to reduce atmospheric pressure and create a vacuum thereby permitting blending to be carried out under reduced pressure. This has been found to provide an effective means of increasing the firmness of the granule.

Hydration of the vegetable protein isolate is an important step in the process of the present invention. In this regard, the vegetable isolate is hydrated with water which has a temperature of at least about 50° C., preferably about 50°-100° C., with a most preferred temperature range of about 60°-80° C. This can be quickly and conveniently carried out in the bowl cutter by the addition of the isolate to the heated water contained in the bowl. The use of heated water is important for obtaining the desired degree of structural integrity and firmness in the protein granule. Preferably the heated water is added to the protein isolate in an amount sufficient to provide a ratio of about 2-3.5 parts by weight of water to about 1 part by weight of vegetable protein isolate. The most preferred ratio of water to isolate is about 3 parts by weight of water to about 1 part by weight of isolate.

Blending of the isolate and water is carried out in the bowl cutter or other suitable apparatus for a period of time sufficient in order to form a hydrated protein granule. The desired granular structure can be readily determined by visual observation. Typically, blending is carried out under conditions of shear or mechanical agitation so that the isolate is formed into a gel which is then chopped or subdivided into individual granules. The above identified bowl cutter, because of the chopping action of the blade provides the requisite degree of shear or chopping action to produce the individual granule but alternatively the hydrated isolate could be separately passed through a mincing machine or similar type of apparatus.

The period of time sufficient to form the individual granules, as noted above can be readily observed by visual observation but typically will be for at least about one minute. Excessive blending is not particularly desirable, both from the standpoint that it represents a waste of energy and could deteriorate the granular structure achieved. Therefore, a preferred range for purposes of blending or mixing of the isolate and water under conditions of shear is about 1-3 minutes. This degree of blending or chopping usually produces the individual granules desired, assuming that the isolate is hydrated in the manner described above.

It is also preferable, as noted above to carry out the chopping or shear step in a vacuum, since this has been found to significantly improve firmness of the granule and the above-identified equipment includes means to provide a vacuum or reduced atmospheric pressure for the cutter. Preferably vacuum applied will be at least about 25 inches of mercury, but can vary depending on the degree of firmness desired. The length of time the vacuum is applied usually for the duration of the chopping or conditions of shear used for making the gel formed by the isolate and water from which the granules are formed.

It is also desirable in the context of the present invention to include additional additives with the vegetable protein isolate such as flavoring, colors, and the like provided that the additive does not adversely affect the granular structure. Examples of suitable flavorings and the like include hydrolyzed vegetable proteins and natural flavorings. Salt can sometimes be added to the vegetable protein isolate although this is not generally preferred for purposes of the present invention since the salt will sometimes interfere with the granule formation depending on the amount added for flavoring purposes. It is preferable therefore, to add any salt needed for flavoring and the like during the time that the hydrated granule is mixed with or used to extend a meat product.

The hydrated protein granule, which is produced as described above is suitable for use as a meat extender without further treatment. The hydrated granule can be frozen in order to provide extended storage or can include various materials such as antimicrobial or antimycotic agents to provide some degree of shelf stability for the hydrated granule, provided that these additives do not interfere with the formation of the granule or are added to the surface of the granules following formation.

The following examples set forth specific but non-limiting embodiments of the present invention.

EXAMPLE 1

In order to evaluate the effect of temperature of the water of hydration a series of samples were prepared as described below. A soy protein isolate, "Supro 500E", available from Protein Technologies International Checkerboard Square, St. Louis, Mo. 63164 was used in each formulation varying set forth in Table 1 below. The temperature of the water used for the hydration as well as the hydration ratio is also set forth.

TABLE 1

|  | Sample | | | | | |
| --- | --- | --- | --- | --- | --- | --- |
|  | 1 | 2 | 3 | 4 | 5 | 6 |
| Soy Protein Isolate (gm) | 4444 | 5000 | 5000 | 5000 | 5000 | 5000 |
| Water (gm) | 15556 | 15000 | 16250 | 15000 | 15000 | 15000 |
| Hydration Ratio (water to Isolate) | 3.5 to 1 | 3 to 1 | 3.25 to 1 | 3 to 1 | 3 to 1 | 3 to 1 |
| Water Temp. °C. | 70 | 70 | 70 | 30 | 50 | 90 |

In each case the entire amount of soy protein isolate was added to the indicated amount of water in a Kramer Grebe 65 liter chopper Model #VSM-65, available from Kramer-Grebe, Biedenkopf-Wallau, Germany. In each case the soy protein isolate and water was blended or chopped at slow speed for 20-30 seconds until mixing was achieved, followed by blending or chopping at high speed under conditions of shear for about 2 to 3 minutes, until a gel is formed. Sample #6 was blended at high speed only for abut 1.5 minutes. A mix speed chop was then employed to break the gel into granules. The following observations were made with regard to the processing of each sample.

Sample #1—After chopping at high speed for 2 minutes a gel formed that was softer than that achieved with a 3 to 1 hydration ratio. The gel formed was too sticky to form distinct granules, even after chopping for an additional minute.

Sample #2—The gel formed well and was cut into individual granules the particles were fairly firm and were distinct granules.

Sample #3—Granules formed were stickier than those from sample #2, although did not form into a mass when squeezed.

Sample #4—The gel that formed was stiff but more sticky than that formed at 70° C. Distinct granule formation was inhibited.

Sample #5—Stiff distinct granules were formed only slightly stickier than sample #2.

Sample #6—A very stiff gel was formed which was easily cut into distinct granules which were firm and not sticky.

Each sample of granules produced as set forth above were placed in bags and refrigerated overnight before performing both an objective as well as a subjective texture evaluation. Each sample was objectively evaluated for firmness with an Instron Universal Testing Machine (Model #1122, Instron Corporation, Canton, Mass. Subjective evaluation for firmness was carried out by usual inspection on a scale of (1 to 10) with 10 being the most firm and 1 being the least firm.

The testing procedure on the Instron machine is described below.

1. Calibrate the Instron with the Kramer-Shear cell according to manufacturer's standard procedure.
2. Weigh 100±1 g of sample. (Sample at 68°-70° F.)
3. Gently load the sample into the cage. Do not pack or shake.
4. Tilt the blade section slightly to straighten the blades, and slip the blades gently into the cage. Do not compress the sample.
5. Slide the assembled shear cage into place.
6. Press Down button.
7. When test is completed, gently slide the shear cell out and discard the sample.
8. Calculate the failure force (kg.) from the peak height recorded on the strip chart.

The results of the above evaluation are set forth in Table 2.

TABLE 2

| Firmness Evaluation of Protein Granules | | | | | |
|---|---|---|---|---|---|
| Sample | | | | | |
| 1 | 2 | 3 | 4 | 5 | 6 |
| Instron (kg) 38.3 | 69.7 | 57.8 | 64.5 | 58.2 | 79.4 |
| Subjective Firmness 3 | 5 | 3 | 4 | 4 | 5.5 |

It may be seen from the above data that the best granules in terms of firmness were obtained with Samples 2, 4, 5, and 6.

EXAMPLE 2

The above procedure was repeated to prepare three samples of granules using a hydration ratio of 2.5 parts of water to 1 part of isolate at varying temperatures for the water of hydration. Each formulation is described in Table 3 below.

TABLE 3

| | Sample | | |
|---|---|---|---|
| | 1 | 2 | 3 |
| Soy Protein Isolate (gm) | | | |
| Water | | | |
| Hydration Ratio | 2.5 to 1 | 2.5 to 1 | 2.5 to 1 |
| Water Temp. °C. | 70 | 60 | 55° C. |

Each of the samples produced above were evaluated for firmness on an Instron Universal Testing Machine as described in Example 1. Sample #1 had an Instron firmness of 89 kg., #2 has 86 kg and #3 has 94 kg. It may been seen based upon the above values that protein granules with a satisfactory degree of firmness were produced with each sample.

EXAMPLE 3

To illustrate the improvement in firmness that is achieved with the use of a vacuum during the gel formation and chopping or blending step two samples of granules were prepared by using a soy protein isolate "Supro 500E" available from Protein Technologies International, Checkerboard Square, St. Louis, Mo. 63164 and forming a gel by hydrating both samples with water at 70° C., to a ratio of water to isolate 2.5 to 1. Each sample was blended in the chopper for 2 minutes during gel formation then choped into discrete granules except that in the case of one sample a vacuum equivalent to 25 inches of Mercury was applied during the chopping step. The firmness of each sample was measured by the Instron test procedure described in Example 1 and the sample obtained without application of a vacuum had an Instron firmness of 125.6 kg and the sample with application of the vacuum had an Instron firmness of 159.7 kg. It may be seen that the application of a vacuum significantly improved firmness of the product.

EXAMPLE 4

Protein granules were produced as generally described in Example 1 using a water temperature of 70° C. and a hydration ratio of water to isolate of 3 to 1. The isolate employed was Fujipro 545, available from Protein Technologies International, Inc., St. Louis, Mo. 63164. The isolate were blended with the water at slow speed for 30 seconds to achieve mixing followed by high shear chopping for two minutes to form a gel. The gel was formed into granules by chopping on mix speed.

The granules produced as described above were then used to prepare low fat beef patties at three different levels of addition. The formulations for the beef patties containing the granules are set forth below.

| Ingredients (% by weight) | Sample 1 | Sample 2 | Sample 3 |
|---|---|---|---|
| 90% Lean Beef | 55 | 40 | 55 |
| 85% Lean Beef | 30 | 40 | 30 |
| Protein Granules | 8 | 12 | 11 |
| Water | 4.12 | 6.62 | 2.87 |
| Beef Flavor (McCormick Beef Flavor #F22072 available from McCormick Stange, Hunt Valley, MD) | 0.37 | 0.38 | 0.37 |
| Corrageenan (Viscarin SD389 | — | 0.5 | 0.25 |

| Ingredients (% by weight) | Sample 1 | Sample 2 | Sample 3 |
|---|---|---|---|
| available from Marine Colloids - Division, FMC Cororation Philadelphia, PA) | | | |
| Starch | 2.0 | — | — |
| Encapsulated Salt (Sodium Chloride 150-85, Van Den Bergh, Lisle, Illinois) | 0.5 | 0.5 | 0.5 |

The protein granules were cooled to a temperature of about 20° C. before mixing with the meat.

The frozen beef is flaked using a Biro FBC 4800 frozen meat chopper available from (Biro Manufacturing Company, Marblehead, Ohio). The flaked meat, water and granules in the indicated amounts are mixed in a Buffalo Mixer ½-5A available from (Hantover Inc., Kansas City, Mo.) for about 1 minute. The remaining ingredients were added to the mixer and blended for an additional 30 seconds. The entire mixture is ground in a meat grinder through a ⅛" plate and formed into patties using a Formax F-6 former available from (Formax Inc., Mokena, Ill.). The formed patties are then frozen in a blast freezer at ($-40°$ C.).

EXAMPLE 5

Protein granules were produced as generally described in Example 1 using a water temperature of 70° C. and a hydration ratio of water to isolate of 3.25 to 1. The isolated employed was Supro 500E, available from PTI, Inc. St. Louis, Mo. 63164. The isolate was blended with the water at slow speed for 30 seconds followed by high shear chopping for 2 minutes. The granules were formed by chopping on mix speed 1-2 minutes.

The granules produced as described above were then used to prepare a meat analog simulating a ground meat patty. The formulation for the meat analog containing the granules are set forth below.

| Ingredients | % by Weight |
|---|---|
| Supro 200 available from (Protein Technologies International, St. Louis, Missouri) | 18.0 |
| Supro 200G, available from (Protein Technologies International, St. Louis, Missouri) | 21.9 |
| Protein Granule | 11.0 |
| Water | 31.8 |
| Supro 620 (Protein Technologies International St. Louis, Missouri) | 3.8 |
| WheatGluten 75 (Fielders Starches, Port Melbourne, Australia) | 2.0 |
| Methyl cellulose, (Methocel A4M, Dow Chemical Company, Midland, Michigan) | 1.5 |
| Soybean oil | 5.2 |
| Salt | 1.0 |
| Flavoring (Ogawa Beef Flavor #B18538, Ogawa, Toyko, Japan) | 2.8 |
| Malt Extract (Black Malt, Malt Products Corporation, Maywood, New Jersey) | 0.4 |
| Beetjuice concentrate (C670, Quest, Sarasota, Florida) | 0.2 |
| Sodium carbonate | 0.4 |

The Supro 200 is mixed with 6% of the water and the sodium carbonate in a Hobart Model A-200D Mixer (Hobart Manufacturing Co., Troy, Ohio) for two minutes. The Supro 200G and protein granule are added to the mixture and mixed one minute. Forty-seven percent of the water (80° C.) is chopped on high speed with the methylcellulose for one minute in a Seydelmann Model K21 (Robert Reiser Co., Inc., Canton, Md.) bowl cutter. The Supro 620 and 47% of the water as ice is added to the cutter and chopped on high speed for 2 minutes. The soybean oil is added slowly with high speed chopping and chopped one minute. The gluten, salt, flavoring, malt extract, and beet juice concentrate are added and chopped 1.5 minutes. The mixture is removed from the cutter and added to the mixture in the Hobart mixer and mixed two minutes. The mixture is formed into patties with a Hollymatic Super Model 54 Food Portioning machine (Hollymatic Corporation, Park Forest, Ill.). Patties are frozen at $-40°$ C.

The above examples describe specific but non-limiting embodiments of the present invention insofar as the formation of the granules and their use. It is intended to include within the spirit and scope of the present invention all reasonable variations and modifications thereto.

What is claimed is:

1. A process for producing a granulated protein product consisting essentially of:
   a. hydrating a vegetable protein isolate with heated water at a ratio of about 2 to 3.5 parts by weight of water to about 1 part by weight of isolate wherein the water is at a temperature of about 50° C. to 100° C.; and
   b. chopping said hydrated isolate in a bowl cutter under conditions of shear for about 1-3 minutes to form a gel, which gel is subdivided into firm, cohesive, hydrated protein granules suitable for use as a meat extender.

2. The process of claim 1 wherein the vegetable protein isolate is a soy protein isolate.

3. The process of claim 1 wherein the water is at a temperature of about 60°-80° C.

4. The process of claim 1 wherein the isolate is hydrated to a ratio of about 3 parts by weight of water to about 1 part of isolate.

5. The process of claim 1 wherein blending is carried out under a condition of reduced atmospheric pressure.

6. The process of claim 5 wherein the reduced atmospheric pressure is at least about 25 inches of Mercury.

* * * * *